Sept. 27, 1938.                C. A. MICHEL ET AL                2,131,634
                                AUTOMOBILE HEAD LAMP
                              Filed Sept. 20, 1935          5 Sheets-Sheet 1
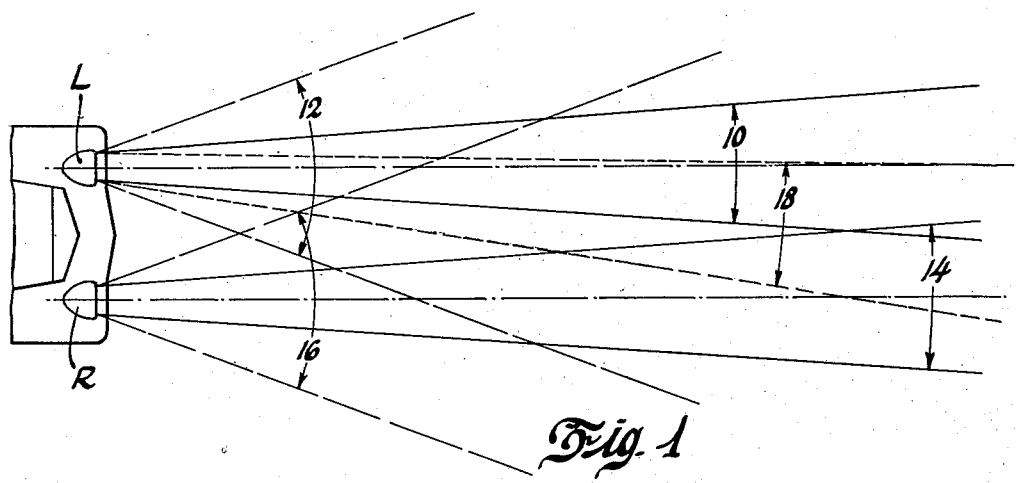
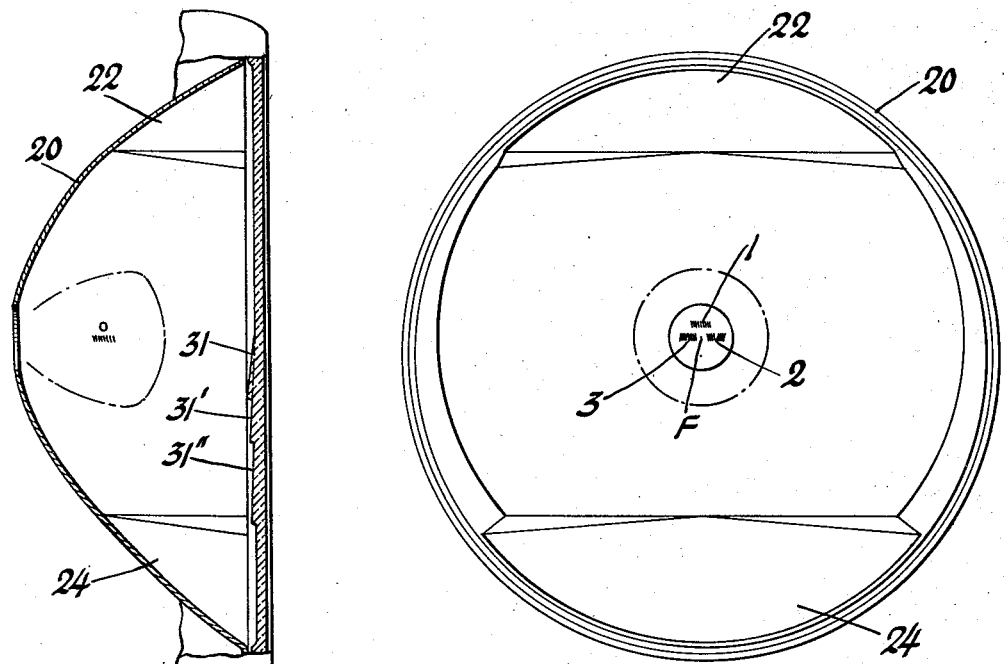

Sept. 27, 1938.  C. A. MICHEL ET AL  2,131,634
AUTOMOBILE HEAD LAMP
Filed Sept. 20, 1935  5 Sheets-Sheet 2
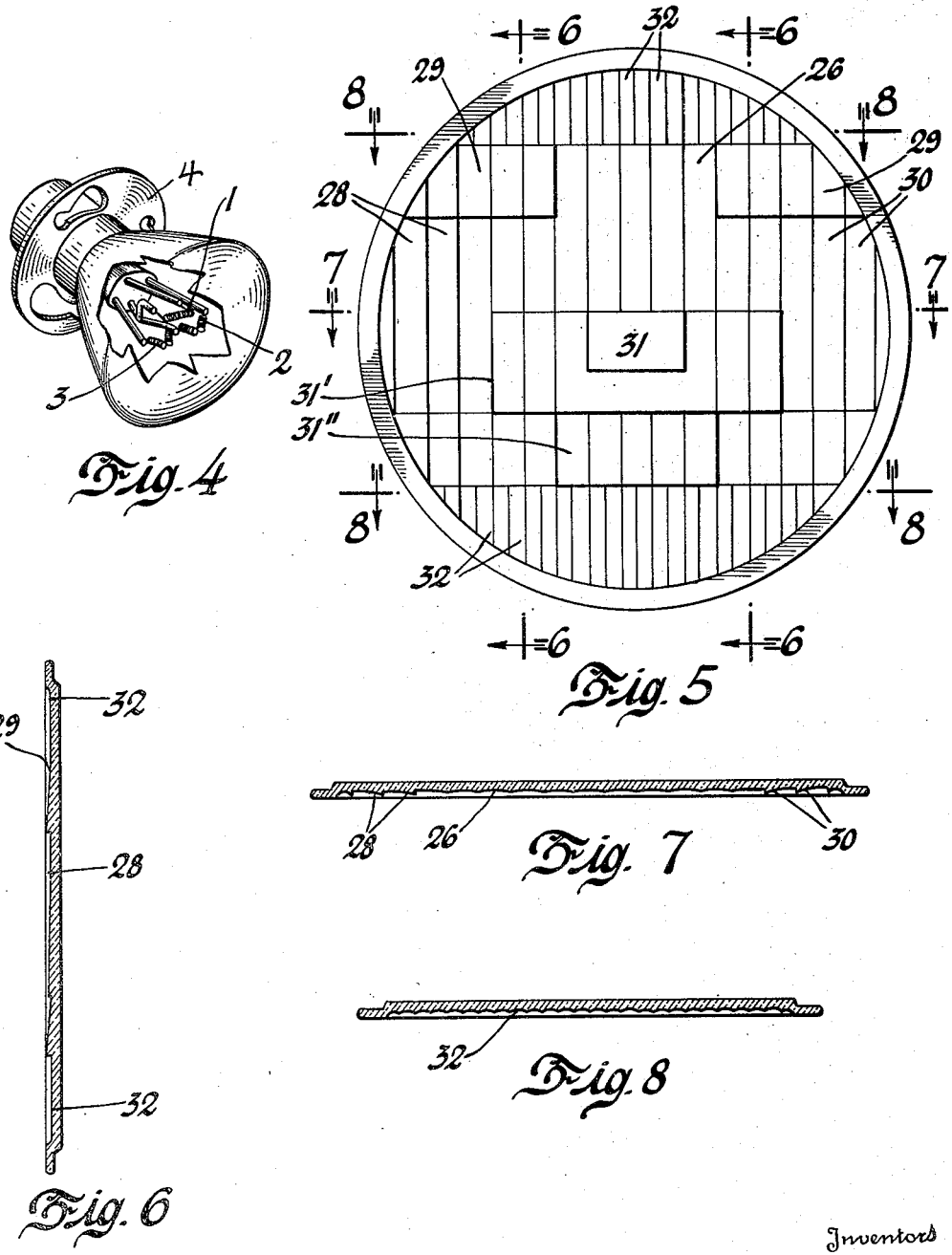

Inventors
Clarence A. Michel &
John L. Koubek
By Blackmore, Spencer & Flint
Attorneys Sept. 27, 1938.　　C. A. MICHEL ET AL　　2,131,634
AUTOMOBILE HEAD LAMP
Filed Sept. 20, 1935　　5 Sheets-Sheet 4
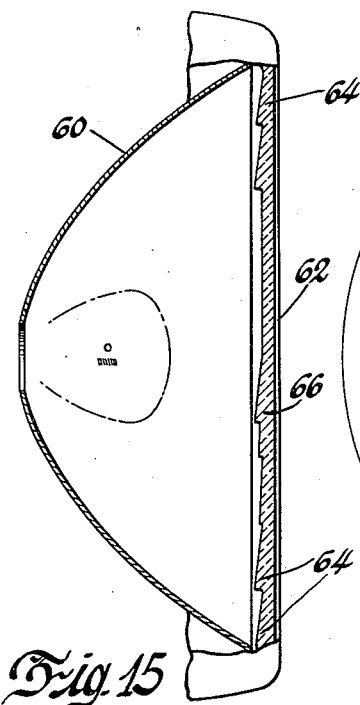
Fig. 15
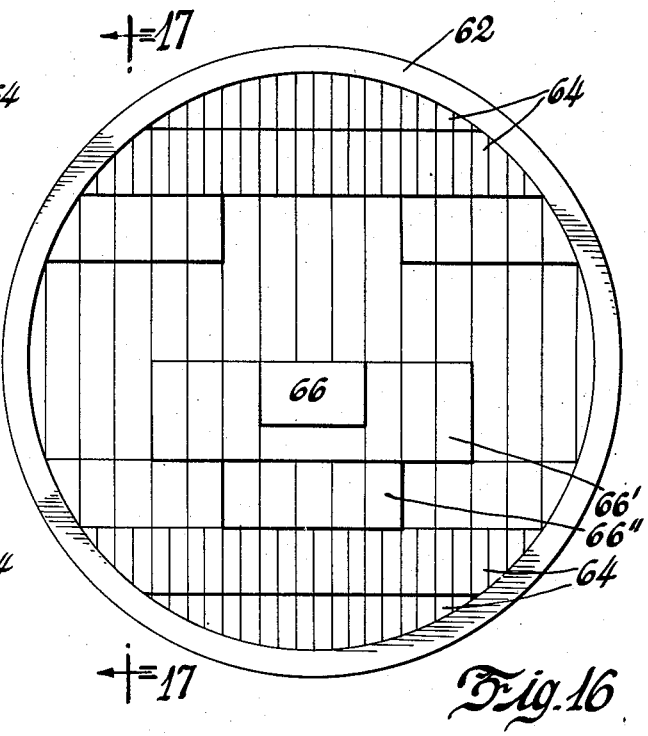
Fig. 16
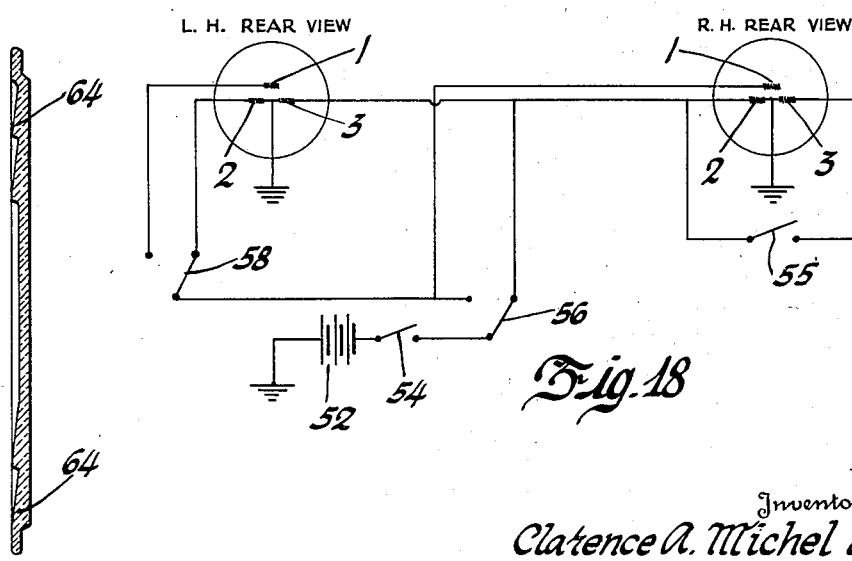
Fig. 17
Fig. 18
Inventors
Clarence A. Michel &
John L. Koubek
By Blackmore, Spencer & Flint
Attorneys

REAR VIEW OF BULB
IN REFLECTOR

Patented Sept. 27, 1938

2,131,634

UNITED STATES PATENT OFFICE 2,131,634

AUTOMOBILE HEAD LAMP

Clarence A. Michel and John L. Koubek, Anderson, Ind., assignors to General Motors Corporation, Detroit, Mich., a corporation of Delaware Application September 20, 1935, Serial No. 41,343

11 Claims. (Cl. 240—41.25)

This invention has to do with a new headlighting system for automobiles, and includes novel lamps and lenses. Modern headlighting systems usually provide a high beam for country driving, a low beam for city driving, and a third beam higher on the right than on the left for passing. It is an object of the present invention to provide an improved system of this type in which the high or country driving beam is characterized by balanced horizontal distribution. Another feature of the invention consists in the provision of more light in the high beam, this being accomplished preferably by employing three filaments at the same time.

Another difficulty encountered with present asymmetric systems arises from the use of asymmetrical flutes on the lens. Headlamp lenses are ordinarily manufactured by pressing, and at the sharp intersections of the flutes the glass tends to form fillets which act as small lenses which in the case of asymmetric flutes throw light to the side opposite that to which the light is directed by the flute. For example, in a lens with asymmetric flutes designed to direct light to the right side of the road, the fillets will direct objectionable extraneous light to the left side of the road. According to the present invention asymmetrical flutes are almost wholly dispensed with, the filament position being relied upon to accomplish projection of light to the right of the road to form the top of the asymmetric or passing beam. The slight additional amount of horizontal spread required can readily be obtained by the use of shallow symmetrical flutes. It has been found desirable to employ a few asymmetrical flutes at the left side of the lens looking in the direction of light projection owing to the fact that the light from this portion of the lens is substantially unaffected by the shift in the position of the light source. The great reduction in the number of asymmetric flutes simplifies the lens design, reduces manufacturing difficulties and cost of production, and at the same time reduces the amount of the stray light from the fillets to such an extent that there is no glare.

In the drawings:

Figure 1 is a diagrammatic plan view showing in full lines the boundaries of the beams projected by a pair of headlamps, and in dotted lines the boundaries of the hot spot of the beam of the left headlamp after shifting to the position it occupies in the asymmetric or passing beam.

Figure 2 is a central vertical section through the reflector and lens of the left headlamp.

Figure 3 is a front view of the reflector of Figure 2 with the bulb in position.

Figure 4 is a perspective view of the bulb.

Figure 5 is a rear view of the lens shown in Figure 2.

Figures 6, 7 and 8 are sections on the corresponding section lines of Figure 5.

Figure 15 is a vertical section corresponding to Figure 2 showing a left-hand lamp embodying a plane parabolic reflector.

Figure 16 is a rear view of the lens of the lamp of Figure 15.

Figure 17 is a section on the corresponding line of Figure 16.

Figure 18 shows a wiring diagram which may be employed.

Figure 9:
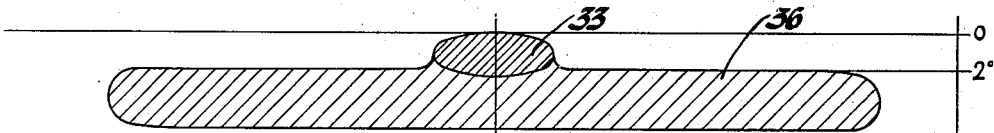
Figures 9, 10 and 11 show the beam patterns projected by the lamp of Figure 2, the first showing the pattern produced by the right-hand filament looking in the direction of light projection, the second showing the pattern produced by the left-hand filament, and the third showing the pattern produced by the upper filament.

In Figure 1 L indicates the left-hand headlamp, and R the right-hand headlamp. The center lines of the lamps are indicated by dot and dash lines. The horizontal range of the hot spot of the left headlamp is indicated by the angle included within the bracket 10. The horizontal range of the remaining light from the left headlight is indicated by the angle included within the bracket 12. The horizontal range of the hot spot of the headlamp R is indicated by the angle included within the bracket 14, and the horizontal range of the remaining light from right headlight R is indicated by the angle included within the bracket 16. Upon shifting from a filament to one side of the focus to a filament to the other side of the focus in the left headlamp as hereinafter explained the hot spot of that lamp is shifted from the position indicated by bracket 10 to the position indicated by the dotted line bracket 18. Simultaneously with this side shift, the light from lamp R drops downward, thereby allowing the light in bracket 18 to form the top right-hand portion of the asymmetric passing beam. To accomplish this result it will usually be found best to use a left headlamp of the construction hereinafter disclosed and to aim the lamp slightly to the right of the car axis—a degree or a degree and a half, so that the hot spot light in bracket 10 is centrally located horizontally with the lamp center line. Without this correction by aiming some of the light rays included within the bracket 18 would be projected to the left of the center line in the passing beam, and would cause glare. The same result may, if desired, be accomplished by slightly angling the reflector in its mounting in the headlamp housing, or by employing a slight side-bending prism over the entire section of the lens producing the hot spot. It will be understood, of course, that the amount of lateral aiming of the lamp and reflector will depend on the filament spacing.

In Figures 2 to 8, inclusive, there is shown the construction of the left headlamp. 20 indicates a reflector having its top zone 22 and its bottom zone 24 tilted downwardly to accomplish dropping of the beam when going from a filament near the focus to a filament above the focus in accordance with the well known principles of design of modern two beam headlamps as described for example in Falge and Godley Patent No. 1,929,111. In Figure 4 there is illustrated the bulb employed in the headlamp. I indicates the upper filament, while 2 and 3 indicate the lower filaments. Each of the filaments is adapted to be independently energized. The filament I is illustrated as of the straight bar type, while filaments 2 and 3 are V-shaped. If preferred, all of the filaments might be of the straight bar type, or slightly arched, or any combination of these may be used, but we have found the type illustrated to be preferable. The bulb is provided with the usual prefocused base, indicated at 4 to enable it to be more accurately positioned in the lamp.

In Figure 3 the bulb is shown in the position it occupies in the reflector, the filaments 2 and 3 being located on the opposite sides of the focal point F, while the filament I is located directly above the focus.

In Figures 5 to 8 is illustrated the preferred form of lens for the left headlamp. As shown in Figure 7 the flutes 26 over the center of the lens are shallow and symmetrical. The flutes 28 over the left side of the lens are unsymmetrical, and are designed to throw the light slightly toward the right of the lamp axis. The flutes 30 over the right side of the central zone of the lens are unsymmetrical and designed to move the light slightly to the left. The flutes 32 over the top and bottom of the lens are symmetrical, preferably of greater spread so as to light the foreground.

We have also found it desirable to provide down-bending prisms on certain portions of the lens to produce better blended patterns. Thus at the upper corners of the central zone of the lens we provide slight down-bending prisms 29, while over the lower central portion of the central zone we provide slight down-bending prisms 31, 31' and 31''.

Figure 9 shows the beam pattern projected by the left-hand headlamp with the filament 3 energized. It will be noted that the hot spot 33 at the top of the beam is projected down the center of the road. The light for this part of the beam comes from the central zone of the lamp. The light from the top and bottom zones is spread through a wide angular range across the width of the road as indicated at 36. It will be noted that the light from the top and bottom is projected 2° below the horizontal so that upon going to the upper filament I the top of the beam will be dropped, thereby confining all the light from the lamp below 2°.

Figure 10:
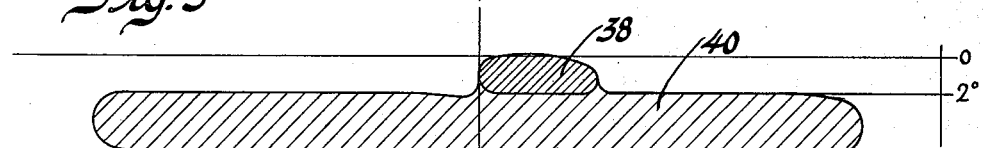

Figure 10 shows the beam pattern projected by the filament 2 of the left headlamp. It will be noted that the hot spot 38 lies wholly to the right of the center line and that the foreground light, indicated at 40, is distributed substantially as before. The sidewise shift of the hot spot from the position shown at 33, in Figure 9, to the position shown at 38, in Figure 10, is accomplished solely by the location of the filaments on the opposite sides of the focal point.

Figure 11:
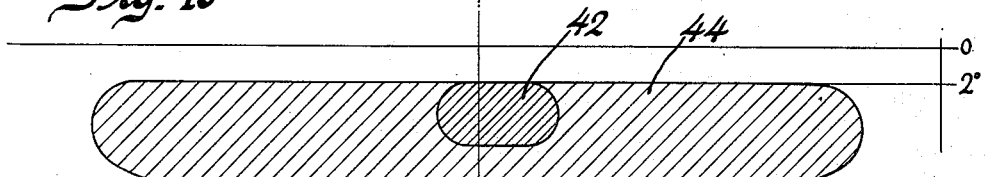

Figure 11 shows the beam pattern projected by filament I of the left headlamp. It will be noted that the hot spot 42 is of greater vertical depth due to the fact that the filament is further out of focus. The hot spot is also slightly to the right owing to the fact that the lamp as a whole has been aimed approximately a degree in that direction. The beam shown in Figure 11 is substantially 2° lower than the beams shown in the other figures, the design in this respect following the usual two beam practice.

The right-hand headlamp R is of conventional two beam design, the light from the central zone, or preferably from the sides of the central zone, forming the hot spot projected straight down the road, while the light from the top and bottom zones is spread in the foreground just as in the case of the light from the top and bottom zones of the left headlamp L. The light from the center of the central zone is preferably projected slightly below the top of the light from the sides of the zone in accordance with usual two beam practice. Inasmuch as the right headlamp is of conventional construction having the top and bottom of the reflector tilted downwardly or the top or bottom of the lens provided with down-bending prisms to accomplish dropping of the beam when going to the upper filament it has not been considered necessary to illustrate it. This type of headlamp and the principles of its design are fully disclosed in the Falge and Godley Patent 1,929,111, having particular reference to Figures 2 to 6, inclusive. The headlamp R is somewhat distinguished from conventional practice in that it is equipped with the bulb shown in Figure 4, the filaments occupying the same position in the headlamp as is indicated in Figure 3. The filaments 2 and 3 of the right headlamp are adapted to be simultaneously energized to produce a concentrated high beam, while the upper filament I may be independently energized to produce the lower beam.

Figure 12:
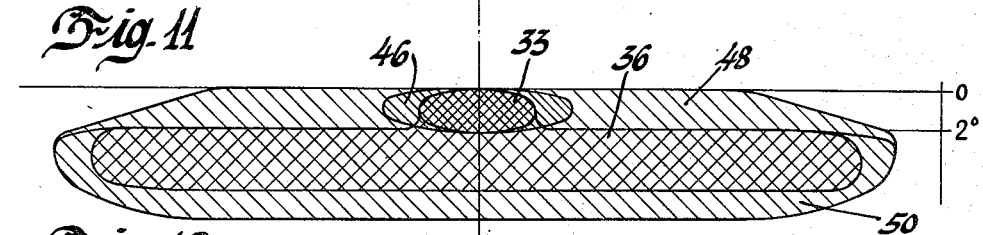
Figures 12, 13 and 14 show the beam patterns of Figures 9 to 11, respectively, combined with the beam patterns produced by the right-hand lamp in the way in which they will be used.
Figure 13:
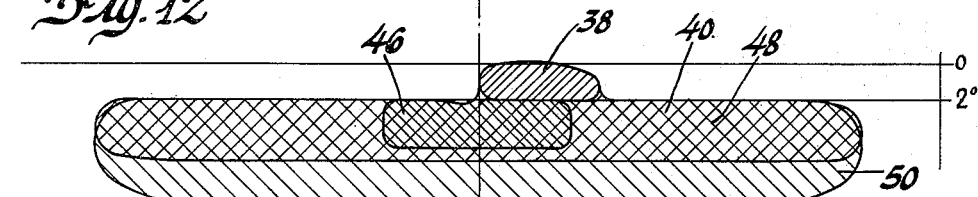
Figure 14:
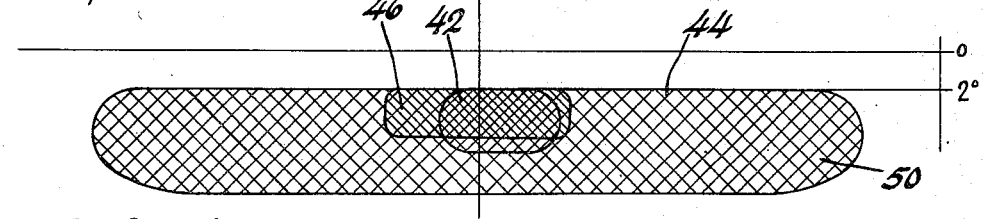

In Figures 12, 13 and 14 are illustrated the preferred beam combinations from the two headlamps. Figure 12 shows the high beam of the left headlamp as shown in Figure 9 combined with the high beam of the right headlamp of which 46 indicates the hot spot, 48 the remainder of the beam from the central zone, and 50 the pattern projected by the top and bottom zones. It will be noted that the light in the combined beam is symmetrically distributed with respect to the center line, and owing to the fact that two filaments are employed in the right headlamp, together with one in the left headlamp, increased intensity is obtained.

The light in the portions 48 of the pattern is very useful in illuminating the shoulders of the road in fast driving. This light must necessarily be obtained from the right headlamp since the upper light from the left headlamp must be of narrow spread to permit sidewise shifting by going to filament spaced slightly to one side of it. Present day bulb design and manufacture place limitations on the distance between filaments so that the maximum side shift obtainable by filament positioning is limited by this factor alone to a comparatively few degrees. The amount of side shift practically available through filament positioning is also further limited by the fact that it is undesirable to have the filaments spaced so far apart that any of them are very much out of focus for this produces distortion of the beam pattern, making it impossible to concentrate light at the top of the beam to the degree desired.

In Figure 13 there is illustrated the beam from the left headlamp shown in Figure 10 combined with the lower beam from the right headlamp. It will be noted that all of the light from the right headlamp is more than 2° below horizontal, while the hot spot of the left headlamp provides high candle power illumination at the same elevation as before but confined to the right side of the road.

In Figure 14 there is shown the lower beam pattern of the left headlamp illustrated in Figure 11 combined with the lower beam from the right headlamp. This beam is of conventional character, and is for use in city driving.

In Figure 18 there is shown a suitable wiring diagram for energizing the filaments to produce the beam combinations described. 52 indicates the usual battery, 54 the switch through which the battery is connected to the lighting circuit, and 56 indicates a switch which may be of the usual plunger type mounted on the floor and preferably having no off position. 55 indicates a switch permitting energization of either one or both of the lower filaments in the right headlamp. With switch 54 closed and switch 56 in the position illustrated and switch 55 closed, current is supplied to filament 3 of the left headlamp and filaments 2 and 3 of the right headlamp, thereby producing the combined beam pattern shown in Figure 12. If switch 55 is opened filament 3 is deenergized, reducing the intensity of the beam from the right headlamp. The light from this lamp is spread so much that the elimination of this filament effects no appreciable change in lateral distribution except to leave more high intensity light on the right than on the left.

58 indicates a selector switch which, if desired, may also be of a type having no off position. With switch 54 closed and switch 56 in engagement with the opposite contact, and with switch 58 in the position shown, current is supplied to filament 2 of the left headlamp and filament 1 of the right headlamp, thereby producing the country passing beam shown in Figure 13. If switch 58 is now moved into engagement with the opposite contact, both of the upper filaments of the two headlamps are energized, producing the lower or city beam shown in Figure 14.

As previously explained, in order to secure the drop in the top of the beam, it is necessary to bend down the light from the top and bottom sections. This may be accomplished as shown in Figure 2 by tilting down the top and bottom zones of the reflector, or as illustrated in Figures 15 to 17, by employing a plain parabolic reflector, together with a lens having down-bending prisms over top and bottom zones. In Figure 15, 60 indicates a plain parabolic reflector, and 62 a lens provided with down-bending prisms 64 at top and bottom, and, if desired, with slight down-bending prisms 66, 66′ and 66″ over the central portion of the central zone. Lens 62 is provided with flutes of the same design as shown in Figures 5, 7 and 8.

Figure 19:
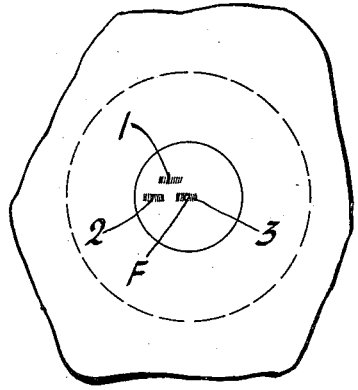
Figure 19 shows a modified form of filament arrangement looking from the rear of the bulb.
Figure 20:
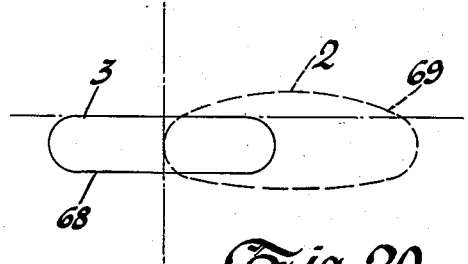
Figure 20 shows the modification in the hot spot of the beam pattern of the left headlamp produced by the modified filament arrangement of Figure 19.

In Figure 19 there is shown a slightly modified filament arrangement in that in this figure the filament 3 is arranged at the focus of the reflector with filament 2 slightly to the left and filtment 1 above and slightly to the left. The principal effect of this change in filament location is shown in Figure 20 in that the hot spot 68 produced by energizing the filament 3 is centrally located without aiming the lamp to one side, and when the filament 2 is energized the hot spot assumes the position and contour shown at 69. The greater depth of the hot spot is due to the out of focus position of the filament 2, and the displacement to the right is somewhat greater than in the preferred form because the filament is further out of focus.

Figure 21:
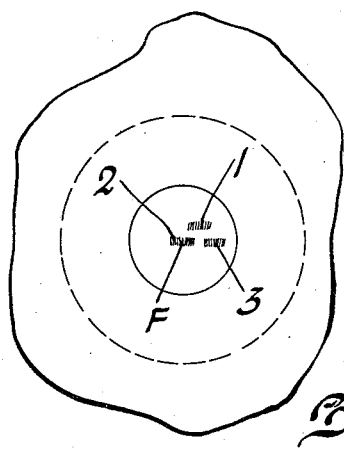

In Figure 21 there is shown a slightly different filament arrangement in that the filament 2 is on focus, while the filament 3 is to the right of focus. With this filament arrangement in the left headlamp, it will be necessary to aim the headlamp somewhat to the right in order to center the beam pattern from the filament 3 on the lamp center line 70′ which is parallel to car axis. The pattern 70 is likewise of increased depth owing to the out of focus position of the filament. This arrangement has the characteristic that the light is concentrated somewhat less at the top of the high beam. The pattern 72 projected by the focal filament 2 is somewhat more concentrated, and gives more intense illumination at the top of the asymmetric passing beam.

Figure 23:
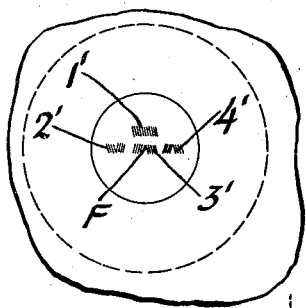
Figure 23 shows a further modification of filament arrangement.
Figure 22:
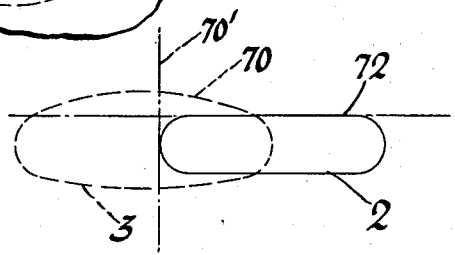
Figures 21 and 22 are views similar to Figures 19 and 20 showing a further modification of filament position and its effect on the hot spot.

In Figure 23 there is shown a further modification in which the bulb contains four filaments numbered 1′, 2′, 3′ and 4′ of which filament 3′ is on focus. With this arrangement all of the hot spot patterns shown in Figures 20 and 22 may be obtained, or any combination of them where a more intense pattern is desired. The upper filament 1′ will, of course, produce a deeper pattern owing to distortion resulting from its being above focus, however the pattern will be approximately 2° below horizontal in accordance with usual practice.

The invention is capable of considerable modification in practice. Thus, if desired, there may be incorporated in the reflector of Figure 2 the feature of axially offsetting portions of the reflector to produce insensitivity as described and claimed in the patents to Clark, 1,136,507, granted April 20, 1915, and Michel, 1,594,544, granted August 3, 1926.

The lenses employed in practice will quite frequently be made in convex form to reduce wind resistance and improve the appearance of the lamp, although they will embody the optical principles herein disclosed.

It will be understood, of course, that while we have described the change of beam patterns as produced by filaments arranged side by side or one above the other, the same results may be accomplished by shifting or tilting a single filament from one position to another within the reflector, the important thing being the position of the active light source with respect to the reflector and lens.

If desired, the right-hand lamp may be of the same construction as the left-hand lamp, both lamps then having any of the filament arrangements shown in Figures 3, 19, 21 or 23. Thus with the filament arrangement of Figure 3 the beam patterns of Figures 9, 10 and 11 may be obtained except that the beams will be of double intensity owing to the employment of two lamps. It will be noted that by shifting from the right-hand filaments to the left hand filaments the beams are shifted to the right. It may be desirable to employ with two beam patterns, such as shown in Figure 10, a third pattern like Figure 11, produced by energizing the upper filament in one of the headlamps.

The light spreading flutes should be substantially vertical to spread the light in a horizontal direction. Where asymmetrical flutes are used on curved lenses it will usually be found desirable to cant them as disclosed in the prior application of John L. Koubek, S. N. 679,296, filed July 7, 1933, to avoid undesirable curvature in the beam pattern. As disclosed in said application oppositely facing asymmetrical flutes may be used in place of symmetrical flutes where desired.

We claim:

1. A pair of headlamps adapted to be mounted at the front of a vehicle and to light the roadway, one of said headlamps comprising light projecting means including a concave light-concentrating reflector and a glass closure, means providing a source of light adjacent the focal region of the reflector or at a point above the focal region, said light projecting means being subdivided into upper, intermediate and lower transversely extending superimposed zones, the rays of light from said upper and lower zones being but slightly affected by shifting from one source to the other while the rays of light from said intermediate zone are shifted sharply downwardly upon energizing the upper source, said upper and lower zones being formed to direct the rays falling upon them beneath the top of the beam produced when the lower source is energized, whereby, upon changing to the upper source, an effective lowering of the beam is secured, said light projecting means being provided with flutes for spreading light on both sides of the lamp axis, the other headlamp comprising light projecting means including a concave light-concentrating reflector and a glass closure, said light projecting means being provided with flutes over the sides of the central zone for spreading light to one side of the reflector axis, while the remaining portion of said light projecting means is provided with shallow flutes for spreading light symmetrically, means providing laterally spaced sources of light adjacent the focus of the reflector, whereby upon changing from the source at the right to the source at the left the top of the beam is shifted to the right; means for simultaneously energizing the lower source of the first-named lamp together with the right-hand source of the second-named lamp to produce a combined beam having its maximum intensity substantially down the center of the road, and means for simultaneously energizing the upper source of the first-named lamp and the left-hand source of the second-named lamp to produce a combined beam higher on the right than on the left for passing.

2. In the combination as defined in claim 1, means for aiming the second-named lamp so as to center the beam from the right-hand filament.

3. In the combination as defined in claim 1, the laterally spaced sources lying on opposite sides of the focus.

4. In the combination as defined in claim 1, one of said laterally spaced sources being at the focus of the reflector.

5. A pair of headlamps adapted to be mounted at the front of a vehicle to light the roadway, each of said headlamps comprising light projecting means including a concave light concentrating reflector and a glass closure, means providing a source of light adjacent the focus of the reflector of one of the headlamps, means providing laterally spaced sources of light adjacent the focus of the reflector of the other headlamp, means providing a source of light above the focus in each of the headlamps, each of said light projecting means being subdivided into upper, intermediate and lower transversely extending superimposed zones, the rays of light from said upper and lower zones being but slightly affected by shifting from a lower source to an upper source while the rays of light from said intermediate zone are shifted sharply downwardly upon energizing the upper source, said upper and lower zones being formed to direct the rays falling upon them beneath the top of the beam produced when the lower source is energized, whereby upon changing to the upper source, an effective lowering of the beam is secured, each of said light projecting means being provided with flutes for spreading the light laterally, a portion of the flutes over the left side of the central zone of the headlamp having laterally spaced sources spreading light to the right of the lamp axis only while the remaining flutes spread light to the left of the lamp axis and on both sides thereof, means for simultaneously energizing the focal source of the first-named headlamp and right hand source of the second-named headlamp to produce a high beam having its highest intensity substantially down the center of the road, means for simultaneously energizing the upper source of the first-named headlamp and the left-hand source of the second-named headlamp to produce a beam higher on the right than on the left, and means for simultaneously energizing the upper sources of the two headlamps to produce a low beam.

6. In the combination as claimed in claim 5, the laterally spaced sources lying on opposite sides of the focus.

7. In the combination as claimed in claim 5, the flutes over the central zone of the light projecting means having laterally spaced sources being of slight spread to concentrate light at the top of the beams.

8. A headlamp comprising light projecting means including a concave light-concentrating reflector and a glass closure, a plurality of laterally spaced sources of light adjacent the focus of the reflector and a source of light above the focus, said light projecting means being subdivided into upper, intermediate and lower transversely extending superimposed zones, the rays of light from said upper and lower zones being but slightly affected by shifting to the upper source while the rays of light from said intermediate zone are shifted sharply downwardly, said upper and lower zones being formed to direct the rays falling upon them beneath the top of the beam produced when the lower source is energized, said light projecting means being provided with flutes for spreading light laterally, the flutes over the sides of the central zone being asymmetric and having their high sides toward the center of the lens to direct light toward the lamp axis, while the remainder are symmetrical.

9. In a headlamp as defined in claim 8, the flutes over the central zone being of relatively slight spread to concentrate light at the top of the beam.

10. A headlamp comprising light projecting means including a concave light-concentrating reflector and a glass closure, a source of light at the focus, a source of light to one side of the focus, and a source of light above the focus, said light projecting means being subdivided into upper, intermediate and lower transversely extending superimposed zones, the rays of light from said upper and lower zones being but slightly affected by shifting to the upper source while the rays of light from said intermediate zone are shifted sharply downwardly, said upper and lower zones being formed to direct the rays falling upon them beneath the top of the beam produced when the lower source is energized, said light projecting means being provided with flutes for spreading light laterally, the flutes over the sides of the central zone being asymmetric and having their high sides toward the center of the lens to direct light toward the lamp axis, while the remainder are symmetrical.

11. A headlamp comprising light projecting means including a concave light concentrating reflector and a glass closure, said light projecting means having upper, lower and intermediate zones, the rays of light from the sides of the intermediate zone being but slightly affected by shifting from one source adjacent the focus to a source displaced slightly laterally therefrom while the rays from the top and bottom zones and from the center of the intermediate zone are shifted sharply to one side, said top and bottom zones and the center of the intermediate zone being provided with symmetrical flutes spreading light on both sides of the lamp axis while the sides of the intermediate zone are provided with asymmetrical flutes having their high sides toward the lamp axis and arranged to concentrate light along the lamp axis, said headlamp being provided with independently operable light sources adjacent the focus and spaced laterally so that upon shifting from one to the other the beam is shifted in a lateral direction.

CLARENCE A. MICHEL.
JOHN L. KOUBEK.